United States Patent
Bansal

(10) Patent No.: US 11,593,449 B1
(45) Date of Patent: Feb. 28, 2023

(54) REDUCING COMPUTING CALLS FOR WEBPAGE LOAD TIMES AND RESOURCES

(71) Applicant: PAYPAL, INC., San Jose, CA (US)

(72) Inventor: Yash Bansal, Bikaner (IN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/393,941

(22) Filed: Aug. 4, 2021

(51) Int. Cl.
G06F 16/904 (2019.01)
G06F 16/957 (2019.01)
G06F 3/0482 (2013.01)
G06F 40/14 (2020.01)
G06F 16/954 (2019.01)

(52) U.S. Cl.
CPC ........ G06F 16/9574 (2019.01); G06F 3/0482 (2013.01); G06F 16/954 (2019.01); G06F 40/14 (2020.01)

(58) Field of Classification Search
None
See application file for complete search history.

(56) References Cited

U.S. PATENT DOCUMENTS

| | | | | |
|---|---|---|---|---|
| 6,862,729 B1 * | 3/2005 | Kuch | ...................... | G06F 9/445 717/151 |
| 2009/0204382 A1 * | 8/2009 | Tung | ..................... | G06F 1/3203 703/21 |
| 2009/0281677 A1 * | 11/2009 | Botich | ................... | G06Q 10/00 705/400 |
| 2009/0307034 A1 * | 12/2009 | Duff | ....................... | G06Q 10/04 707/999.107 |
| 2010/0070404 A1 * | 3/2010 | McConnell | .......... | G06Q 30/018 705/317 |
| 2011/0184784 A1 * | 7/2011 | Rudow | ............. | G06Q 10/0639 701/29.6 |
| 2011/0208551 A1 * | 8/2011 | Johnson | ................ | G06Q 10/02 705/5 |
| 2014/0114867 A1 * | 4/2014 | Volkmann | ............. | G06Q 10/30 705/308 |
| 2015/0200994 A1 * | 7/2015 | Jain | ..................... | H04L 67/5681 709/219 |

* cited by examiner

Primary Examiner — Maikhanh Nguyen
(74) Attorney, Agent, or Firm — Haynes and Boone, LLP

(57) ABSTRACT

There are provided systems and methods for reducing computing calls for webpage load times and resources to reduce power usage and/or carbon footprints caused by repetitive navigations. A service provider, such as an online transaction processor, may provide computing services to users, which require computing devices of the users to interact with the service provider and load data on the computing devices, including webpages and application interfaces. Each of data loading event may have a cost, where repeating events may lead to unnecessary power usage, carbon emissions and/or a carbon footprint. A graph algorithmic process may utilize state diagrams of processing flows for data loading events with attributes for each data loading event to identify problematic repeated events. Once the problematic events are identified, the service provider may identify corrective actions to avoid or reduce the repetitive events, such as by merging data into one or more events.

20 Claims, 7 Drawing Sheets

US 11,593,449 B1

REDUCING COMPUTING CALLS FOR WEBPAGE LOAD TIMES AND RESOURCES

TECHNICAL FIELD

The present application generally relates to processing computing calls for webpage resources, and more particularly to reducing the number of computing calls executed for webpages and other resources.

BACKGROUND

Users may utilize service providers in order to access computing services provided by such service providers. These computing services may include electronic transaction processing services via online transaction processors. When accessing and utilizing these services from online platforms, webpages and/or application interfaces may be required to be loaded to client computing devices. For example, a computing device may navigate to a main webpage, login and navigate to a dashboard with a checkout interface and navigate to other webpages and/or interfaces that present data. Each one of these navigations executes a server call and retrieves database or cached resources, which consumes power and causes carbon emissions due to the power consumption. For example, the electricity used during server calls and data loading may cause a substantial carbon footprint by requiring significant electricity and other resources to power the computing devices performing the operations, especially with the large and ever-increasing number of operations being formed through various types of computing devices. This is not carbon neutral and instead may lead to significant pollution and/or carbon waste. Such processing of calls may also reduce efficiency in computers, with respect to both processing time and costs. However, some webpages may be loaded more often than others, such as central dashboard and/or main checkout webpages. These are reloaded multiple times and therefore unnecessarily waste resources when returned to after viewing a less commonly visited webpage. Thus, it is desirable to offset this unnecessary waste when executing server calls for webpages and loading webpages on computing devices.

Figure 1:
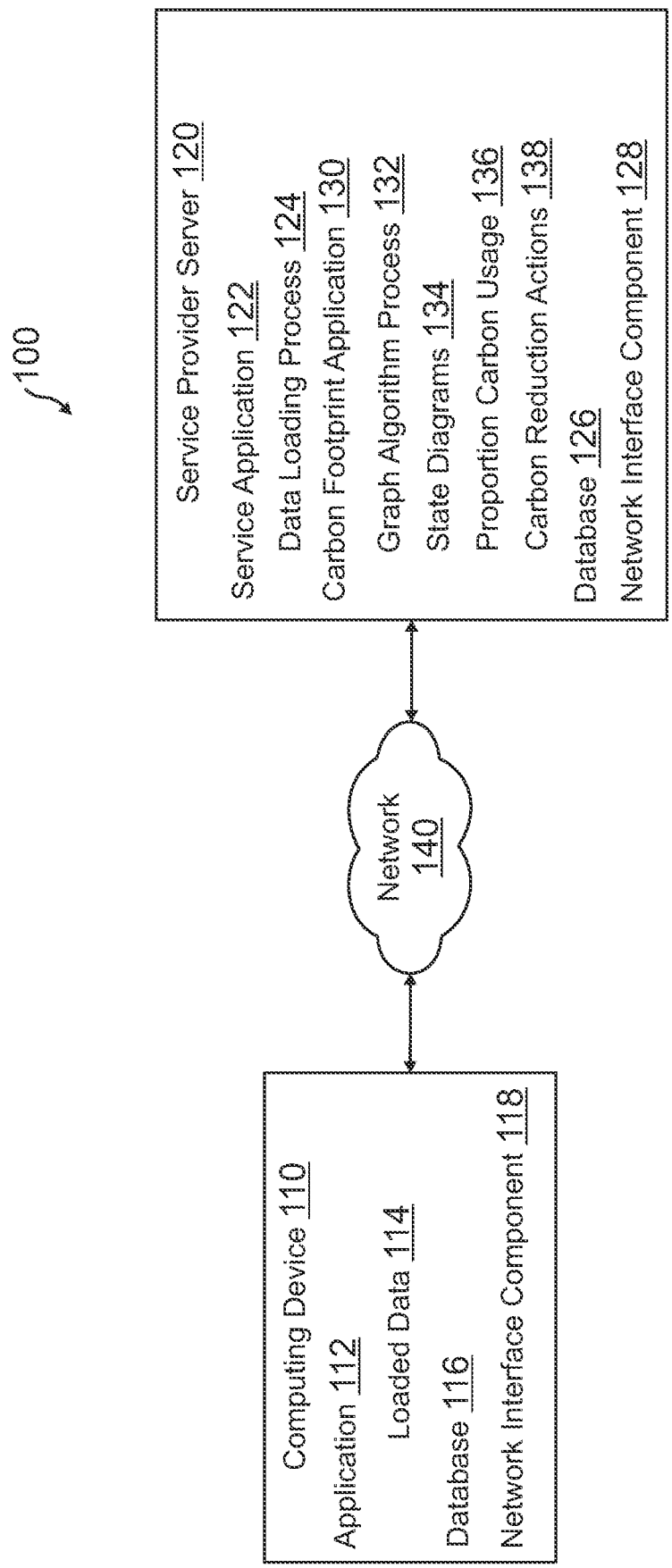
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for reducing computing calls for webpage load times and resources to reduce carbon footprints caused by repetitive navigations and improve computer efficiencies. Systems suitable for practicing methods of the present disclosure are also provided.

A user may utilize online service providers, such as transaction processors, via their available online and networked platforms. For example, a user may make a payment to another user or otherwise transfer funds using the online platforms of the service providers. When accessing online platforms and utilizing the corresponding computing resources, server calls are executed to retrieve database records and/or cached data, process the data, and load the data on client computing devices, such as personal computers, mobile smart phones, and the like. Application programming interface (API) calls may be executed between different applications and APIs of the systems, which result in these server calls that consume resources. For example, data loading events for webpages and/or resident software applications on computing devices may consume network resources, power and server resources during data processing and loading, and/or database resources for data lookup and retrieval. This requires data processing by computing devices, which can result in large consumption of electricity and other resources when repeatedly executed. Further, other usages of server, network, and database resources add additional carbon footprints from the usage and availability of these computing devices and structures. Usage of these resources is therefore not carbon neutral, and a large number of transactions, data loading events, webpage or application interface data loading, and the like may cause a significant carbon footprint for service providers' computing infrastructure, as well as reduce computer efficiencies.

For example, loading a home webpage of a service provider may produce a significant amount of carbon dioxide ($CO_2$), such as 0.10-0.40 g of $CO_2$. When thousands, or even millions, of these events occur over a time period, significant resources may be consumed. Some pages may have larger page sizes and computations, where many different loading events have significant carbon emissions. However, during some navigations and actions, computing devices may return to certain webpages of application interfaces, which is inefficient from both a carbon footprint analysis and an optimization of computing resources, time, and data processing. Similarly, with resident software applications and other data loading events, some data may be repetitively loaded. In this regard, an algebraic solution may be provided through graph theory-based models to identify navigation and webpage flow issues and update/improvise merged webpages to reduce processing power usage and carbon emissions from repetitive loading events.

In this regard, a user may wish to process a transaction, such as for a payment to another user or a transfer. A user may pay for one or more transactions using a digital wallet or other account with an online service provider or transaction processor (e.g., PayPal®). An account may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The account and/or digital wallet may be loaded with funds or funds may otherwise be added to the account or digital wallet. The application or website of the service provider, such as PayPal® or other online payment provider, may provide payments and the other transaction processing services via the account and/or digital wallet.

Once the account and/or digital wallet of the user is established, the user may utilize the account via one or more computing devices, such as a personal computer, tablet computer, mobile smart phone, or the like. The user may engage in one or more transactions with a recipient, such as a recipient account or digital wallet that may receive an amount of a payment. When establishing an account, generating a transaction, or otherwise using service provider services, webpages and/or application interface data may be retrieved through server calls and data may be processed and loaded to computing devices. In order to minimize these server calls and data loading events, an algebraic graph theory-based solution may be utilized to identify and update/improvise major flow issues during data loading events. This allows the service provider to improve those issues such that the service provider utilizes less computing power and produces a minimum carbon emission. Further this provides less resistance/friction when executing a particular flow/transaction via webpages and application interfaces. This is performed via a state diagram indicating a processing flow between data loading events and/or webpage/interfaces, where mathematical algorithms are used to find/identify webpages and application interfaces which can be improvised, improved, and/or combined to reduce computing power needed for transactions and reduce carbon emissions and other costs.

In order to determine a state diagram for the data processing and/or loading events, navigations, and the like, a processing flow and/or navigational flow for a corresponding data loading event is identified and/or created by the service provider. This corresponds to the processing flow that is to be analyzed to reduce power consumption and/or a carbon emission, footprint, and/or other associated cost(s). For example, a processing flow may represent a series of data processing and/or data loading events that occur when activity and interactions occur between a service provider's server and other computing platforms and architecture (including server calls to data resources and/or databases to retrieve, process, and/or load data) and a computing device or server of a user, merchant, business, or other entity. Navigational flows may correspond to similar or a subset of these processing flows, such as those that occur when computing devices interact with the service provider's server and computing platforms to navigate between different webpages of one or more websites (including navigations to third-party webpages) and/or between different resident or mobile software application interfaces. These flows may further include side flows, such as those that navigate to sub-pages, interfaces, or data loading events that branch or offshoot from a main flow (e.g., when looking up a return policy and/or process from a checkout and/or digital shopping cart interface for transaction processing), which may end without returning to the main processing flow. Within a processing or navigational flow, there may be certain data loading events and/or navigations that are revisited, such as a main checkout page for electronic transaction processing or a transaction processing history for an account. Thus, each data loading event, webpage/interface in a navigational flow, and the like may be assigned a unique identifier that identifies when that data is loaded or that webpage/interface is visited and loaded. For example, an initial webpage when entering authentication information to login to an account may be label "A," a welcome webpage after a "B," an account transaction history a "C," and so forth.

Thereafter, using the sequence of data loading events and/or navigations, a state diagram is generated. The state diagram may utilize the sequence of events and/or navigations, which may be represented by their identifiers, to show the flows through the events and/or navigations. Further, the state diagram may show transitions between states, such as between an entry action, a transition and/or transaction condition to a next state, and so forth. In some embodiments, this may also be demonstrated and/or represented by a directed graph, such as a directed acyclic graph (DAG) having different events or navigations as nodes that are connected to create edges. In this regard, using the state diagrams of the flows between webpages, application interfaces, and/or other data loading and/or processing events, repetitive data loading events may be identified and reduced, which can lower power consumption and carbon emissions caused by these repetitive computing actions.

For the data loading events, a variety of attributes of these data loading events may be determined. For example, with webpages and/or application interfaces, a number of page or interface views, a data size of the webpage or application interface payload, and/or a loading time taken by a network and server call of the webpage/interface may correspond to a set of three attributes that are to be analyzed. However, with other data loading events, different attributes may also be used, such as processing time and/or resources required, database lookup times and/or number of lookups, required number of machines to process the data loading event, and the like may also or instead be used as attributes. The data for these attributes may be determined and/or scraped from the webpages, interfaces, servers and/or machines processing these events, and the like. For example, a monitoring operation or component may collect and/or scrape metadata for these events as they occur over a time period and/or when the events are initiated and/or processed. These attributes are then fed and processed by a graph algorithmic operation of one or more applications to determine carbon emissions, a carbon footprint, and/or another cost (e.g., carbon cost, processing resource usage cost, network communication and/or bandwidth cost, and/or the like) for each data loading event and series of data loading events.

In order to identify problematic data loading events, such as those that are repeated due to intermediary data loading events that occur and cause repetitive loading of the same data, webpage, or application interface, the graph algorithmic operation and/or application may process the state diagram or other graph with the attributes to determine carbon costs and/or other cost for each data loading event. With the entire processing flow, as well as between repeated or revisited data loading events within the processing flow, a total carbon or other cost may be determined. For example, the processing flow may have a cycle from start to finish within the state diagram, such as by proceeding from the aforementioned webpage A to webpage B to webpage C returning to webpage B and returning to webpage A. Further, sub-cycles may be identified within the processing flow from the state diagram, such as if webpage C is revisited multiple times while navigating to another sub-webpage D or E and/or where webpage B is revisited in the previous cycle. From the attributes, a carbon or other cost may be identified for each data loading event. Thus, revisited webpages, application interfaces, and/or data loading events may be identified.

However, by analyzing the sub-cycles, combinations of data loading events occurring between a repeated event may be analyzed for combination with the repeated event, thereby reducing the power usage and carbon cost to repeat the event. In this regard, a reducing factor may be applied to combine the cost of each event, while the repeated event may be eliminated. The reducing factor may reduce the carbon or other cost by causing the data for the intermediary event causing the repeated event to be loaded with the repeated event. This reducing factor may reduce the carbon or other cost by an amount, such as 10% (e.g., the reducing factor would be a 0.9 coefficient to the cost) or another amount. Further, the repeated event is no longer repeated, so an overall cost is reduced by at least the amount of repeating the event (e.g., by only having the event occur once, not twice and causing the second cost of the event).

In response to identifying problematic or inefficient webpages and/or application interfaces during processing flows (e.g., navigations, data processing or loading events, and the like), actions may be taken to reduce the number or amount of reloading of webpages and/or application data. These webpages and/or interfaces may correspond to those that are repetitively loaded and/or returned to after viewing other webpages and/or interfaces, such as when returning to a home page, dashboard interface for an account, main checkout digital shopping cart, transaction authorization or payment, and the like from other webpages that may be visited only once or a few times (e.g., under a threshold). Merging events may therefore prevent these repetitions of events. For example, webpages may be merged into a singular webpage, or data that is relevant from webpages or interfaces that are navigated to from the problematic webpage or interface may be extracted and presented within the webpage or interface that receives the repetitive navigations. The problematic webpage may also be provided with options or processes, such as pop-up windows, drop down menus or data, and the like, to present data from the webpages and interfaces that would cause navigation away from the problematic webpage or interface and later return navigation to that problematic webpage or interface.

Other events may merge data into a single processing and/or loading event, thereby preventing the need to repeat actions for data processing and/or loading. However, it may not be most efficient or ideal to merge all data processing events into a single event. For example, a webpage or application interface that has too much data, interface elements, operations, and the like may be unwieldy, difficult to view and/or use, or otherwise sub-optimal. Similarly, by adding too much data and/or operations to a single event, the event may take considerable amount of time to process and/or load. Thus, the operations to reduce carbon and other costs by merging, combining, or improvising additional events may include an upper limit or maximum on a number of combinations, amount of combined data and/or webpages, and/or data selected for combination in an event.

Thereafter, the service provider may further continue to monitor attributes and processing flows, including how the attributes and processing flows change. The service provider may feed into the graph algorithmic operation as changes to attributes and events occur. In this manner, the service provider may reduce computing and network resources used when loading data, such as by combining data loading events to reduce and/or eliminate repeated events. These processes conserve computing resources of the service provider and improve data loading times and events with computing devices interacting with the service provider's servers and platforms. Further, reduction of navigations and required server calls in turn allow the service provider to be more green and efficient and reduce power usage and carbon emissions and footprints caused during power and resource consumption for computing interactions.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a computing device 110 and a service provider server 120 in communication over a network 140. Computing device 110 may interact with service provider server 120 over network 140 to utilize computing services, such as those that process payments through a payments platform, application, and/or application extension. During use of these services, computing device 110 may engage in different processing and/or navigation flows between different events, webpages, and/or application interfaces that load data, such as content, interface elements, fields, menus, and data processing operations. Such flows may be analyzed to combine certain events in order to reduce power usage, carbon costs and other costs occurring from such events.

Computing device 110 and/or service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Computing device 110 may be implemented using any appropriate hardware and software configured for wired and/or wireless communication with service provider server 120, and/or other computing devices and servers for data processing and use of computing services. Computing device 110 may correspond to an individual user, consumer, or merchant that utilizes computing services provided by service provider server 120. In various embodiments, computing device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Computing device 110 of FIG. 1 contains an application 112, a database 116, and a network interface component 118. Application 112 may correspond to executable processes, procedures, and/or applications with associated hardware. In other embodiments, computing device 110 may include additional or different software as required.

Application 112 may correspond to one or more processes to execute modules and associated devices of computing device 110 to provide a convenient interface to permit a user for computing device 110 to utilize services of service provider server 120, such as those to enter, view, and/or process transactions, onboard and/or use digital accounts, and the like. In this regard, application 112 may correspond to specialized hardware and/or software utilized by computing device 110 that may provide transaction processing, such as through a user interface enabling the user to enter and/or view a transaction for processing. This may be based on a transaction generated by application 112 using a merchant website or by performing peer-to-peer transfers and payments. Application 112 may be associated with account information, user financial information, and/or transaction histories. However, in further embodiments, different services may be provided via application 112, including messaging, social networking, media posting or sharing, microblogging, data browsing and searching, online shopping, and other services available through service provider server 120. Thus, application 112 may also correspond to different service applications and the like that are associated with service provider server 120.

In this regard, application 112 may process, display, and/or output loaded data 114 for a data loading event, such as a visited webpage and/or application interface. Loaded data 114 may correspond to data received from service provider server 120 after processing and loading the data during interactions by application 112 with service provider server 120, such as service application 122. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website, including navigating between webpages to login to accounts, process transactions, and/or otherwise utilize computing services. However, in other embodiments, application 112 may include a dedicated software application of service provider server 120 or other entity (e.g., a merchant) resident on computing device 110 (e.g., a mobile application on a mobile device), which may be configured to navigate between application user interfaces (e.g., applications interfaces displayable by a graphical user interface (GUI) associated with application 112).

Computing device 110 may further include database 116 which may include, for example, identifiers such as operating system registry entries, cookies associated with application 112 and/or other applications, identifiers associated with hardware of computing device 110, or other appropriate identifiers. Identifiers in database 116 may be used by a payment/service provider to associate computing device 110 with a particular account and other data maintained by the payment/service provider. Database 116 may also further store data processed and output via application 112, such as loaded data 114 in one or more data caches and/or more permanent data storages. Database 116 may further provide data to determine analytics and/or attributes when data is loaded, such as data load time, number of webpage or interface visits, and the like. However, such data may also be monitored, determined, and stored by service provider server 120.

Computing device 110 includes at least one network interface component 118 adapted to communicate with service provider server 120 and/or other computing devices or servers over network 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide computing services to users over a network. Service provider server 120 includes one or more processing applications which may be configured to interact with computing device 110 when providing computing services. In one example, service provider server 120 may be provided by PAYPAL®, Inc. of San Jose, Calif., USA. However, in other embodiments, service provider server 120 may be maintained by or include another type of service provider.

Service provider server 120 of FIG. 1 includes a carbon footprint application 130, a database 126, and a network interface component 128. Service applications 122 and carbon footprint application 130 may correspond to executable processes, procedures, and/or applications with associated hardware. In other embodiments, service provider server 120 may include additional or different modules having specialized hardware and/or software as required.

Service applications 122 may correspond to one or more processes to execute modules and associated specialized hardware of service provider server 120 to provide one or more services to end users of service provider server 120, such as process a transaction between users or entities or provide other computing services. In this regard, service applications 122 may correspond to specialized hardware and/or software used by a user associated with computing device 110 to access computing platforms and resources provided by service provider server 120 and interact with computing services. In this regard, service applications 122 may process and load data to computing device 110 based on data from one or more data resources (e.g., database 126 or another internal database, data cache, external data resource, application or other computing operation, and the like). Service applications 122 may receive one or more API calls from computing device 110 for data when utilize computing services, which may provide API responses and the like for data that is loaded on computing device 110, such as loaded data 114.

Data loading processes 124 may be used for such data loading events with computing device 110. In this regard, server calls may correspond to data processing and/or loading events executed by data loading processes 124, where data is provided to service provider server 120 for processing and loading on computing device 110. However, other calls may also be executed by data loading processes 124 between different applications, data resources, and the like, which may process and exchange data between different processing stacks, computing devices and servers, and the like. In this regard, data loading processes 124 may correspond to processes to load and/or navigate between webpages, application interfaces, and the like, or otherwise load data to computing device 110. In order to determine a processing and/or navigational flow between these events, data loading processes 124 may further include or be used to determine state diagrams, directed graphs and/or DAGs, and the like, which may represent a flow between different events, webpages, and/or application interfaces.

In one embodiments, service applications 122 may be used to establish an account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 120. The payment account may be accessed and/or used through a browser application and/or dedicated payment application executed by computing device 110 to engage in transaction processing through service applications 122. Service applications 122 may also correspond to messaging, social networking, media posting or sharing, microblogging, data browsing and searching, online shopping, and other services available through service provider server 120.

Carbon footprint application 130 may correspond to one or more processes to execute software using associated hardware components of service provider server 120 to determine a carbon footprint, carbon emissions, processing usage, and/or other costs associated with certain data loading events, processing and/or navigational flows including the data loading events, and/or repeated navigations to these data loading events within the flows. In some embodiments, carbon footprint application 130 may correspond to specialized hardware and/or software used by service provider server 120 to process these flows based on the data loading events and attributes or analytics for these data loading events in order to determine where corrective actions may be taken to reduce a cost of data loading events that are repeated, such as a carbon cost for emissions or other carbon footprint, of repeating data loading when computing device 110 engages in the corresponding flow. In this regard, carbon footprint application 130 includes a graph algorithm process 132 that may be used to identify problematic data loading events that are repeated and cause a significant carbon footprint, emissions, or other cost, and processes to eliminate the repetitive actions that reduces this cost.

Graph algorithm process 132 may be executed by carbon footprint application 130 when determining whether operations to merge data and/or data loading event, improvise new or combined events, and the like may result in a lower carbon footprint and/or cost without causing over-merging and/or undesirable results. In this regard, graph algorithm process 132 may determine and process state diagrams that represent data processing, loading, and/or navigation flows between different webpages, application interfaces, and/or other data loading events. State diagrams may be generated by representing each webpage, interface, or event as a state or other node (e.g., in directed graphs and/or DAGs), and linking those states or nodes with connections as edges in the diagram or graph, where connected states or nodes for the edges show transitions between different webpages, interfaces, or events when proceeding through the corresponding flow. State diagrams may therefore correspond to a cycle, which may include sub-cycles, of navigations, transitions, and the like between these events.

Carbon footprint application 130 may then execute graph algorithm process 132 with state diagrams 134 and attributes for each webpage, interface, and/or event (represented as a state or node), to determine proportional carbon usage 136 caused by each transition, data loading event, and repeated data loading event in the flow. Attributes may correspond to those attributes linked to a cost, such as a computing power usage, carbon cost for carbon emissions and/or a carbon footprint caused by a data loading event. In this regard, the attributes may include a number of visitors or views/loads of an event, a payload or other size or amount of data loaded with the event, and/or a time taken by a network call and subsequent loading (e.g., network resource and/or bandwidth usage). Thus, each attribute causes a carbon or other cost associated with electrical, network, and/or processor usage.

Proportional carbon usage 136 may therefore identify problematic webpages, interfaces, and/or data loading events, such as those that are repeated, reloaded, and/or revisited a number of times and therefore cause increased and potentially unnecessary power usage, carbon and/or other costs. Graph algorithm process 132 may identify cycles between repeated events that may be reduced or eliminated in order to reduce or avoid the repetition of an event using state diagrams 134 with proportional carbon usage 136, as discussed in further detail with regard to FIGS. 3A-3C. Proportional carbon usage 136 may use a reducing factor to determine a carbon or other cost that occurs when an event is combined with an event that is repeated, which may cause the repeated event to occur less, such as once or fewer times by eliminating the repeated loading and/or navigation.

When one or more problematic repetitions of one or more events are detected, carbon reduction actions 138 may be executed to reduce the repetitions of the event(s) within the processing or navigational flows. For example, carbon reduction actions 138 may correspond to corrective actions that merge all or a portion of the data from one or more intermediary or interstitial events between a repeated event. Carbon reduction actions 138 may merge or combine the data into a single event, such as a single loaded webpage or interface, or may create an improvised or placeholder event, webpage, interface, or the like to combine such data. Further, carbon reduction actions 138 may further add menus, selectable options to show and/or hide data, and the like to present the information within a single webpage or interface without cluttering the webpage or interface. Thus, carbon reduction actions 138 may include further options to streamline data presentation when combined from multiple events in a flow. However, to prevent over-combining too much data from webpages, interfaces, and/or events within a single data loading event, a maximum data amount, size, and/or number of webpages/interfaces may be established with graph algorithm process 132.

In some embodiments, carbon reduction actions 138 may further and/or instead include executable action and/or options to reduce other computational complexity and/or cost of performing data loading events. For example, data loading events may be combined and/or simplified to reduce strain on server resources and/or increase server availability. This may be done by minimizing the number of machines or computes utilized during specific data loading events. In other embodiments, the data loading events may have corresponding data in databases for service provider server 120 that may be reduced or eliminated by combining such data into a single database, database table, and/or database call/search query result. Databases that include the same or similar data may be combined so that data may be more quickly and/or easily accessed and retrieved without multiple and disparate database queries and/or look-ups.

Additionally, service provider server 120 includes database 126. Database 126 may store various identifiers associated with computing device 110. Database 126 may also store account data, including payment instruments and authentication credentials, as well as transaction processing histories and data for processed transactions. Database 126 may further be used to store attributes scraped, monitored, and/or determined from one or more webpages, application interfaces, and/or other data loading events that may be associated with a carbon or other cost of performing, processing, and/or loading such event. Additionally, state diagrams 134, proportional carbon usage 136, and/or carbon reduction actions 138 may be stored by database 126 for use in reducing power usage, carbon and other costs when executing processing and/or navigational flows with computing device 110.

In various embodiments, service provider server 120 includes at least one network interface component 128 adapted to communicate computing device 110, and/or another device/server for a merchant over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
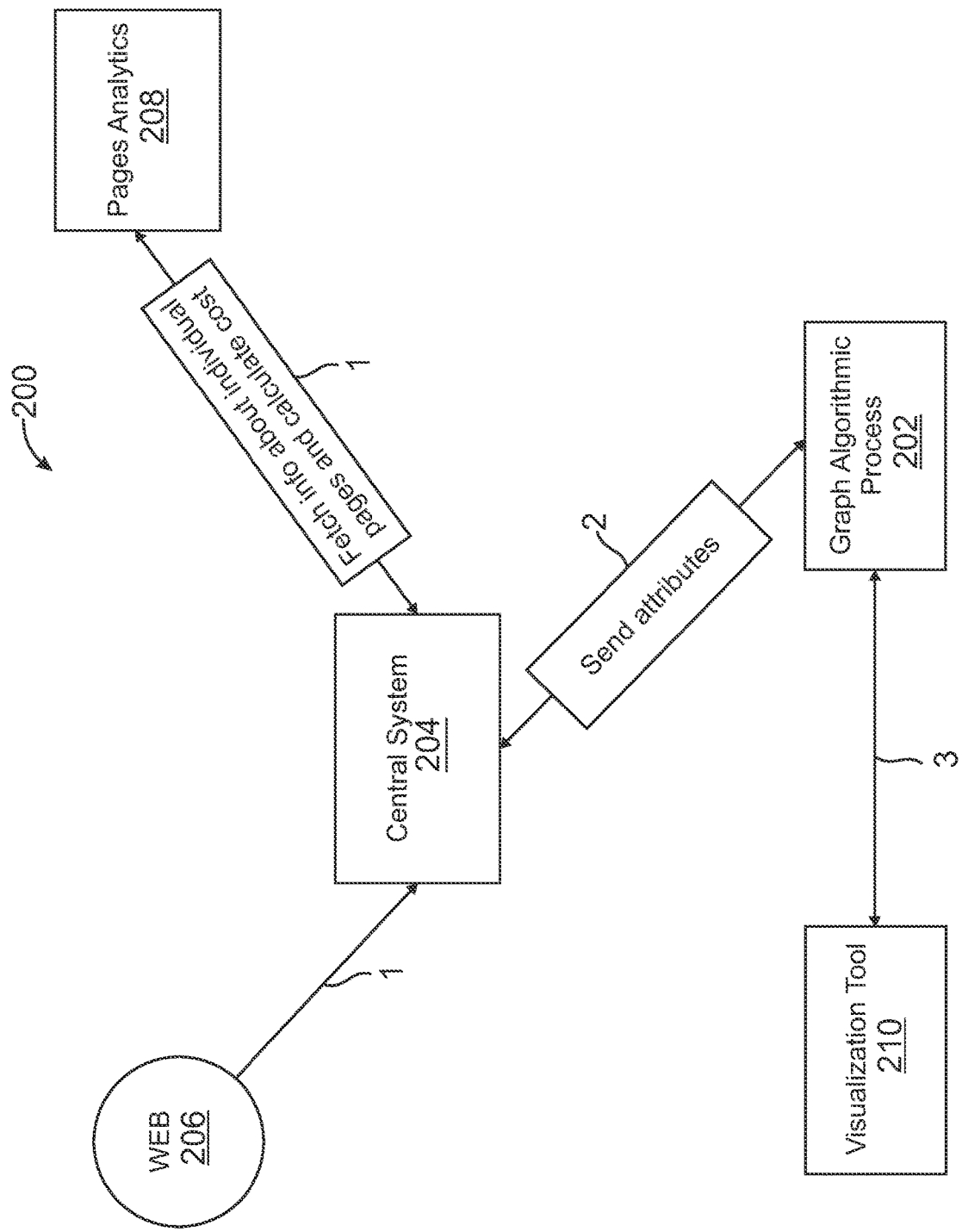
FIG. 2 is exemplary system environment having interactions between different systems and components when determining problem data loading events and webpages, according to an embodiment.

FIG. 2 is exemplary system environment 200 having interactions between different systems and components when determining problem data loading events and webpages to reduce power usage and/or carbon emissions, according to an embodiment. System environment 200 includes interactions between systems and components of one or more servers and/or computing platforms, including cloud computing computes and environments, of a service provider, such as service provider server 120 discussed in reference to system 100 of FIG. 1. System environment 200 may correspond to a system having interactions for outputting and visualizing problematic data loading events that cause excessive power usage, carbon and other costs in order to execute corrective actions and/or data merging events.

In system environment 200, the service provider's computing system may include a graph algorithmic process 202 in order to identify repeated navigations to and/or requests for an event that loads data. This may include a navigation to a webpage or application interface and other types of data processing and loading with a computing device utilizing a computing service provided by the service provider. In order to initially determine carbon and other costs (e.g., processor and/or data processing costs, network resource usage costs, database storage costs, etc.), at an interaction 1, a central system 204 may scrape, monitor, and/or otherwise determine data from a web resource 206 (e.g., all or a portion of webpages and/or web resources for a navigation flow on a website). This may correspond to external and/or third-party webpages, hosted webpages on a network (e.g., the Internet or one more local network), and/or internal applications and/or webpages of the service provider (e.g., those accessible to internal end users of the service provider). More generally, instead of webpages, application user interfaces and/or other data processing and loading events may be monitored and/or scraped for identification and data.

Further, at interaction 1, after gathering of the unique webpages (or others unique interfaces and/or other unique data loading events), central system 204 then gathers the data, and attributes for these unique webpages may be retrieved from page analytics 208, such as a centralized and/or distributed data resource that may be internal or external to the service provider. The fetched information about individual pages may include page views, payload size for the pages, and/or a time to load of the pages, however, other attributes may also be used. After retrieval of the corresponding attributes and analytics, a cost, digital footprint, carbon emission, or the like may be calculated and determined for each webpage when visited by users (e.g., via computing devices), and therefore a corresponding actual and/or proportional cost for each webpage. The proportional cost may be determined for a specific processing and/or navigational flow, such as when a webpage is accessed and loaded in a flow (e.g., when occurring as one or more states through transitions in a state diagram). Thus, a proportional cost, carbon footprint, and/or carbon emission rate or amount may be assigned for a particular webpage that may be proportional to the number of page views, page and/or payload size, and time taken to load the webpage.

At an interaction 2, central system 204 responds to graph algorithmic process 202 to send the attributes and corresponding power usage, carbon or other costs for processing. The calculated cost, carbon footprint or the like may then be fed to graph algorithmic process 202. At interaction 2, graph algorithmic process 202 may find one or more most optimal pairs of webpages (or other interfaces and/or data loading events) inside which a chain of a state diagram, directed graph, DAG or the like that may be merged to form a single webpage that reduces power usage, a carbon or other cost. Additional discussion of graph algorithmic process 202 to determine these power usage costs, carbon costs, optimal pairs, corrective actions, and/or data merging actions or events is discussed in further detail with regard to FIGS. 3A-3C. Once the optimal pairs and other data has been determined by graph algorithmic process 202, at an interaction 3, the results may be formatted and provided to different users via a visualization tool 210 to analyze the applications and/or webpages for possible routes and scopes of improvements to reduce costs.

Figure 3A:
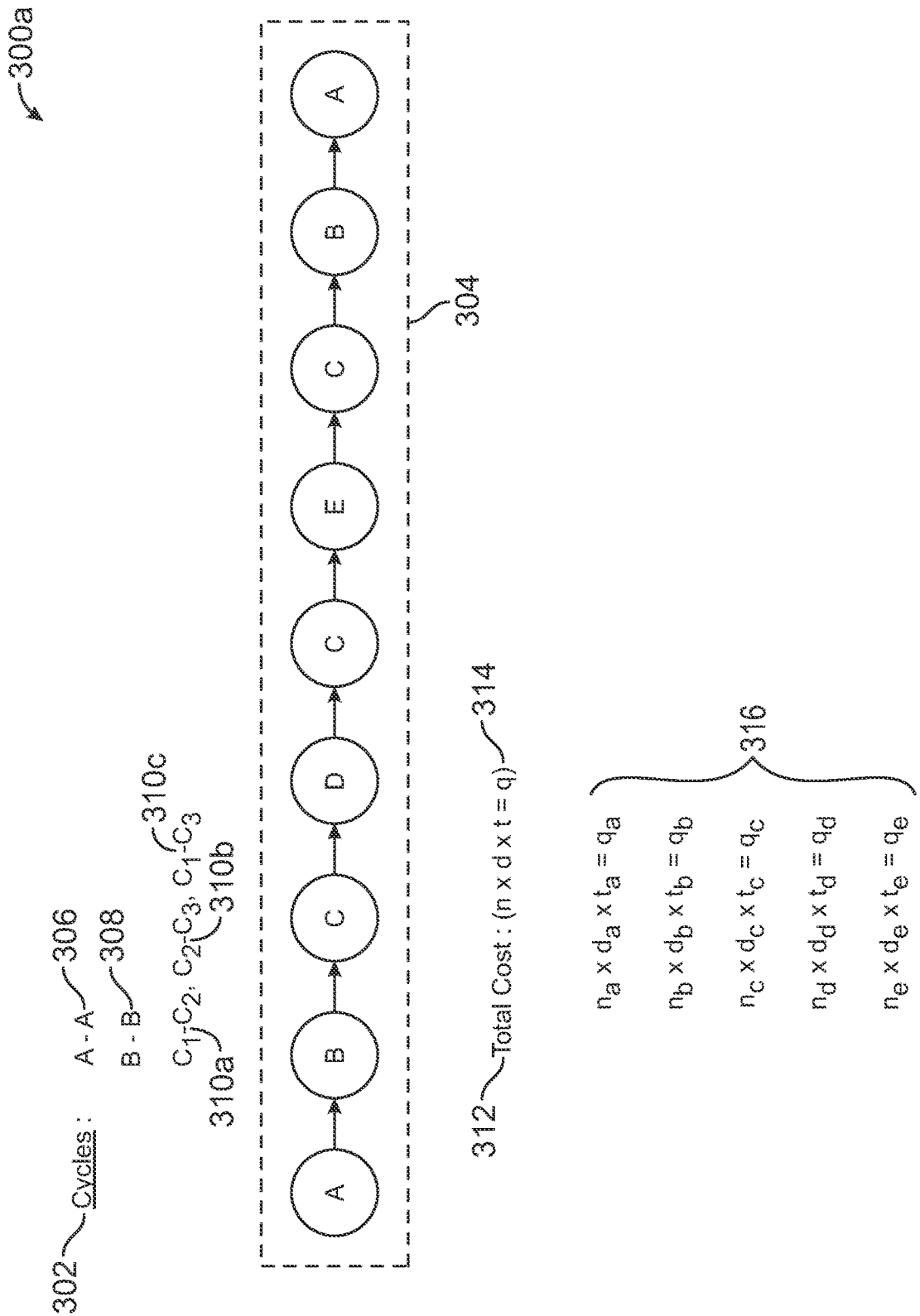
FIGS. 3A-3C are exemplary diagrams for calculations of carbon emissions caused by repetitive computing calls in order to determine revisited events for reducing computing calls for servers, according to an embodiment.
Figure 3B:
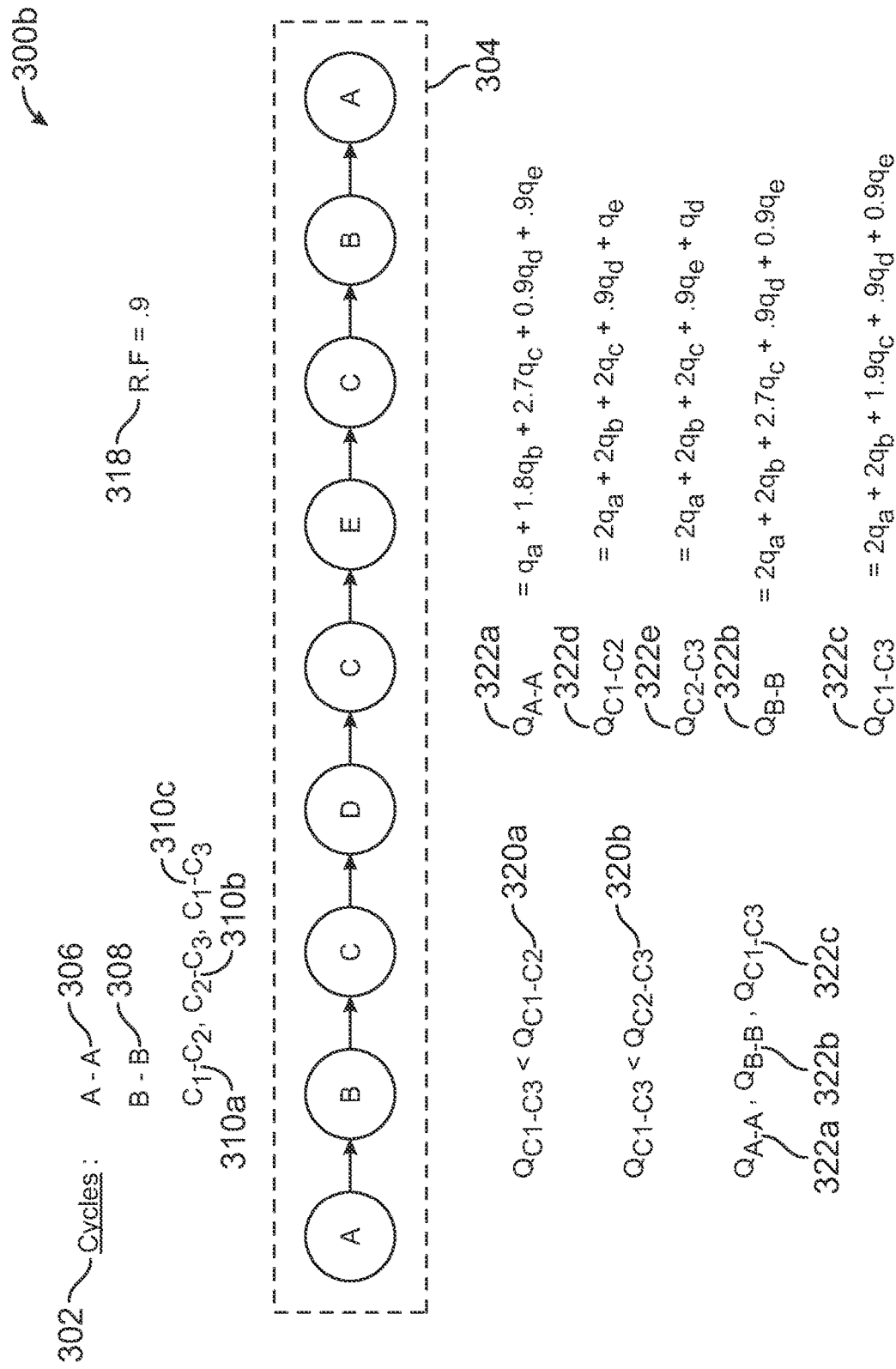
Figure 3C:
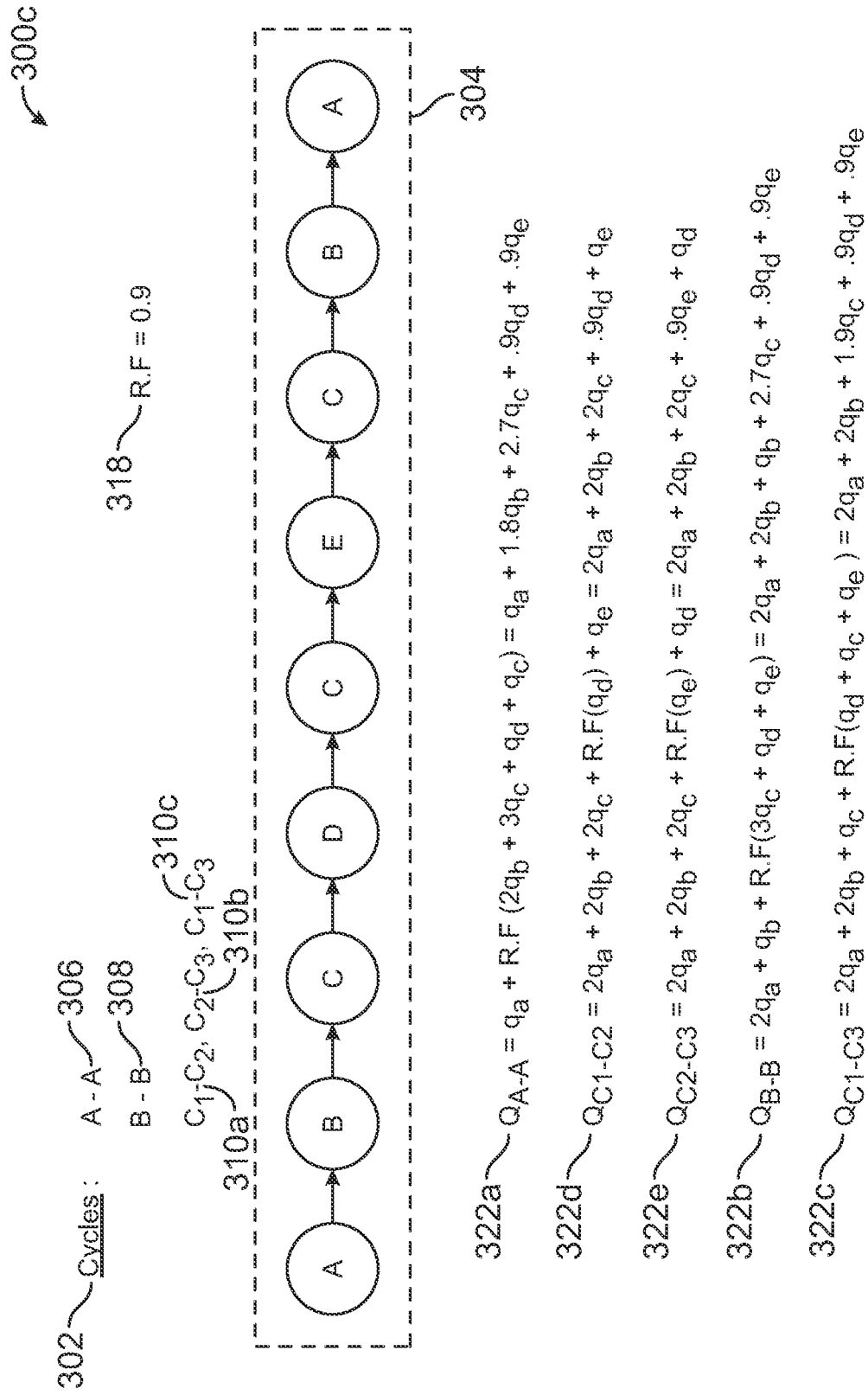

FIGS. 3A-3C are exemplary diagrams 300*a*, 300*b*, and 300*c* for calculations of power usage and/or carbon emissions caused by repetitive computing calls in order to determine revisited events for reducing computing calls for servers, according to an embodiment. Diagrams 300*a*-300*c* may correspond to the mathematical processes and operations executed by a service provider, such as service provider server 120 discussed in reference to system 100 of FIG. 1, when determining one or more data loading events to merge, combine, or improvise within another data loading page to reduce carbon and/or other costs. In this regard, may be executed by graph algorithmic process 202 as discussed in reference to system environment 200 of FIG. 2.

In diagram 300*a*, cost determinations may be made for different data loading events in a processing flow that is represented as a state diagram, directed graph, DAG, or the like. For example, in diagram 300*a*, cycles 302 are shown for a state diagram 304 that includes five different data loading events, such as five webpages visited during a data processing and/or navigational flow. State diagram 304 may represent a flow where a user may log in to an account, view one or more webpages and/or dashboard interfaces, and navigate between different webpages, however, the states in state diagram 304 may also correspond to other data loading events. For example, where state diagram 304 shows navigations to different webpages during a navigational flow, state diagram 304 may include a webpage A, a webpage B, a webpage C, a webpage D, and a webpage E (represented as their corresponding letters in state diagram 304). As can be seen, the order of the state diagram and transitions (e.g., navigations to and/or between webpages A-E) is represented as A→B→C→D→C→E→C→B→A.

Thus, cycles 302 include cycles and sub-cycles of revisited webpages, including a first cycle 306 of A→A, which is the start to end of state diagram 304. A first sub-cycle 308 of revisited webpages is B→B. Additionally, webpage C is revisited three times, resulting in three sub-cycles, a second sub-cycle 310a of $C_1→C_2$, a third sub-cycle 310b of $C_2→C_3$, and a fourth sub-cycle 310c of $C_1→C_3$, where $C_1$ is the first occurring webpage C, $C_2$ is the second occurring webpage C, and $C_3$ is the third occurring webpage C in state diagram 304. In order to calculate an actual and/or proportional cost for visiting and/or loading each of webpages A-E by a computing device when proceeding through a navigational flow for webpages A-E represented by state diagram 304, a total cost 312 equation may be used. In total cost 312, n represents a number of webpage views, d represents a data size of a webpage or a payload of a webpage, and t represents a time taken by a network call and/or to load a webpage. Thus, total cost 312, represented as q for a webpage (e.g., the cost for loading the webpage or otherwise performing the data loading event, such as power usage, a carbon cost, carbon footprint, and/or carbon emissions caused by the event) may be calculated using a cost formula 314 shown as q=n×d×t. A cost for loading each of webpages A-E may correspond to $q_a$, $q_b$, $q_c$, $q_d$, and $q_e$, respectively. The equations are shown as follows:

$$q=n\times d\times t($$
$$n_a\times d_a\times t_a=q_a$$
$$n_b\times d_b\times t_b=q_b$$
$$n_c\times d_c\times t_c=q_c$$
$$n_d\times d_d\times t_d=q_d$$
$$n_e\times d_e\times t_e=q_e$$

Equations 1

Diagram 300b demonstrates how costs for cycle 306, as well as first sub-cycle 308, second sub-cycle 310, third sub-cycle 310b, and fourth sub-cycle 310c may be calculated and allow for determination of power usage costs or carbon costs and identification of optimal and/or suggested combinations of webpages, webpage data, and/or other data loading events to reduce carbon and other costs. In this regard, when eliminating a navigation to a new webpage from an originally visited webpage (or otherwise eliminating a data loading event), such that navigation from a top or hierarchy webpage for the originally visited webpage is eliminated and the new webpage is not visited, a carbon or other cost may be reduced. In this regard, there is no longer a second navigation to the same webpage, such as when webpage C is first loaded in state diagram 304, navigated away to when webpage D is loaded, and then reloaded during a repetitive navigation to webpage C in state diagram 304. Thus, webpage C is loaded once, webpage D is not loaded, and only the carbon or other cost for $q_c$ occurs.

However, for this to occur, all or a portion of the required data for webpage D the flow of state diagram 304 is required to be merged, combined with, or otherwise imitated or improvised in webpage C (e.g., through pop-up windows, displayable or output data, menu selections to reveal data, and the like). Thus, webpage C may have a higher carbon or other cost for loading due to this additional data, although that may be reduced by a factor by no longer fully loading webpage D. In diagram 300b, a reducing factor 318 corresponds to the reduction of the cost of loading webpage D, $q_d$, which may be by 10% (e.g., leading to a 0.9 coefficient for $q_d$). Reducing factor 318, or other reduction percentage or amount, may be assumed, set by a system administrator or data scientist, determined from past analytics, and/or dynamically set based on changing carbon costs and/or webpage or data loading analytics.

A cycle cost may be represented by Q, where Q identifies a cost by adding all webpage loading events in the corresponding cycle into the original webpage that was loaded and visited by a computing device. This corresponds to merging all following webpages in state diagram 304 into the first visited webpage that is later reloaded in state diagram 304. As previously discussed, five cycles for repeated navigations to a webpage within state diagram 304 (e.g., a webpage originally loaded is then later loaded again in state diagram 304), which are A→A, B→B, $C_2→C_3$, and $C_1→C_3$ (e.g., cycle 306, first sub-cycle 308, second sub-cycle 310, third sub-cycle 310b, and fourth sub-cycle 310c). Thus, five cycle costs are calculated for reducing and/or removing repeated loading of one or more of webpages A-E, cycle cost 322a of $Q_{A→A}$, cycle cost 322b of $Q_{B→B}$, cycle cost 322c of $Q_{C1→C3}$, cycle cost 322d of $Q_{C1→C2}$, and cycle cost 322e of $Q_{C2→C3}$.

In cost comparison 320a, $Q_{C1→C3}$ is shown as greater than $Q_{C1→C2}$. Similarly, in cost comparison 320b, $Q_{C1→C3}$ is shown greater than $Q_{C2→C3}$. Cycles costs 322a-322e represent a carbon cost incurred by incorporating all following pages between the first loading of one of webpages A-E to the repeated loading of the same webpage. For example, using state diagram 304 of A→B→C→D→C→E→C→B→A, with $Q_{A→A}$, webpage A is visited once and B→C→D→C→E→C→B are combined into A (e.g., by combining data for webpages B, C, D, and E into A). Similarly, with $Q_{B→B}$, C→D→C→E→C are combined with B and B is not revisited later, with $Q_{C1→C3}$, D→C→E are combined and $C_3$ is not revisited, with $Q_{C1→C2}$, webpage D is combined and $C_2$ is not revisited, and with $Q_{C2→C3}$, webpage E is combined and $C_3$ is not revisited. Thus, the previous cycle costs 322a-322e represent the process to calculate and determine a correspond proportional cycle score for combining webpages in each cycle. While the aforementioned cycles may be reduced to eliminate redundancies, such as by present data in or with a webpage instead of causing a navigation away from, and then back to, the webpage, different cycles may be used to reduce carbon emissions and/or consumption of computing and database resources. For example, cycles may be analyzed and presented to introduce a different processing and/or navigation flow that arrives at the same or similar endpoint. This may be done by changing the navigations through webpages A-E, such as by presenting webpage E prior to webpage C and therefore not requiring a navigation away from, and back to, webpage C.

Diagram 300c shows an expanded view of how to calculate each of cycle costs 322a-322e based on loading of webpages A-E in each cycle, considering the number of webpage loads for each of webpages A-E (e.g., including the repetitions for reloading or repeating a navigation to a webpage, which therefore again incurs the corresponding cost). In diagram 300c, each coefficient in cycle costs 322a-322e for individual webpage loading cost q may correspond to a number of loadings of that webpage, which may be reduced by reducing factor 318 when incorporated within and/or merged with another webpage or data loading event. Thus, if webpage C is visited twice, a cost would be $2q_c$, and if visited three times, would be $q_c$. However, each coefficient, when combined into another webpage, may be reduced by reducing factor 318 of 0.9 that is applied to merged webpages and/or data for these loading events.

These results and corresponding proportional costs for the cycles may be determined, output to a user, and/or used to determine merging events, such as those previous discussed for $Q_{A \to A}$, $Q_{B \to B}$, $Q_{C1 \to C3}$, $Q_{C1 \to C2}$, $Q_{C2 \to C3}$. When merging data, such as by combining data and/or creating an imitation or improvised webpage, application interface, or data loading event, the proportional costs may be used to determine if merging should occur. Further, a maximum amount of merged data and/or number of merges (e.g., number of webpages and/or interfaces merged) may be considered so that webpages do not become overly cumbersome and/or unwieldy for users. For example, the merging event for $Q_{A \to A}$ may not be used, as four webpages would be combined with webpage A. However, $Q_{C1 \to C3}$ may be used, since webpages D and E may be a smaller amount of merged data and/or webpages that are combined with webpage, or only $Q_{C1 \to C2}$ and/or $Q_{C2 \to C3}$ may be used since only single webpages and their data may be merged with webpage C.

Figure 4:
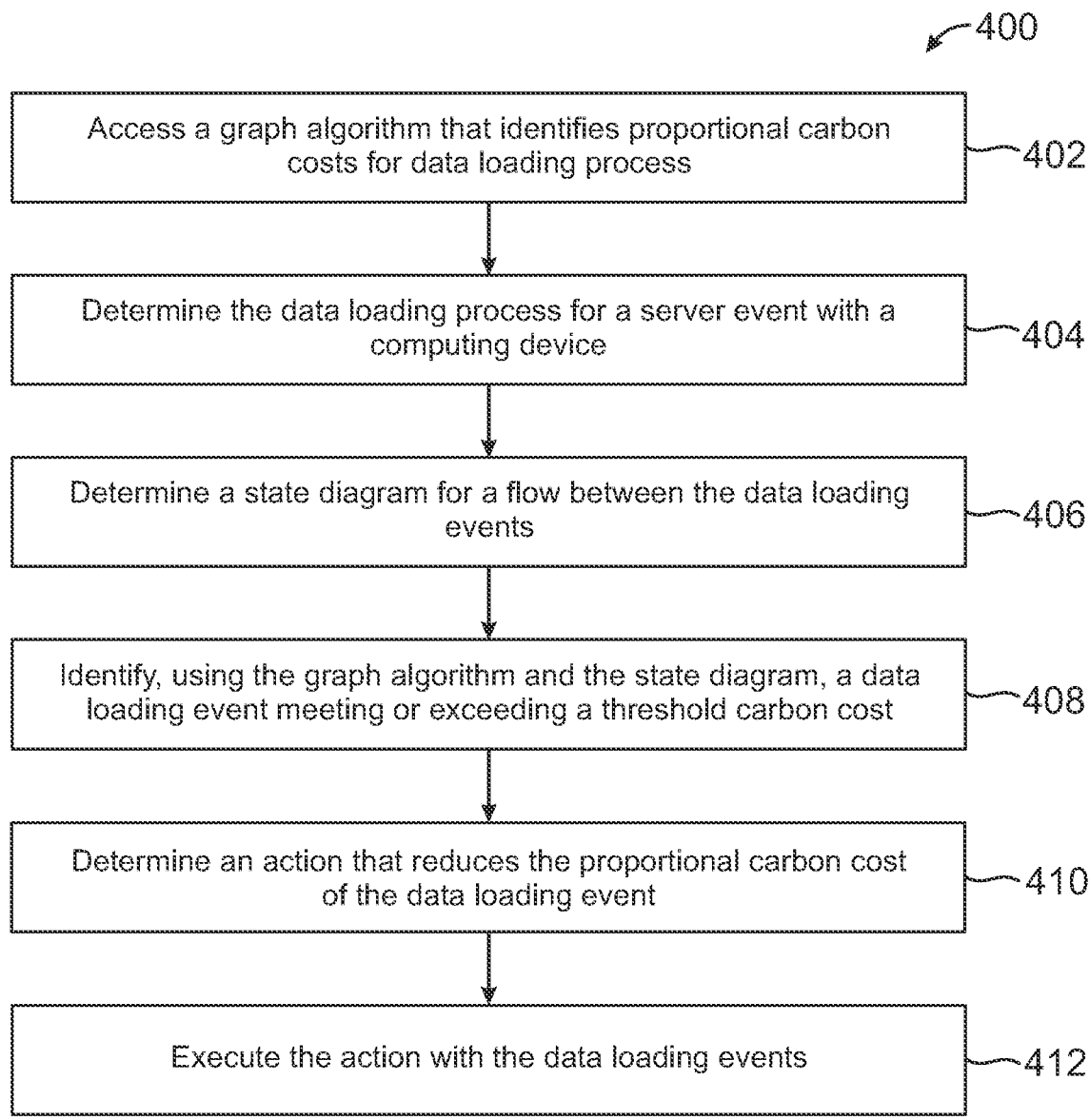
FIG. 4 is a flowchart for processes for reducing computing calls for webpage load times and resources caused by repetitive navigations, according to an embodiment.

FIG. 4 is a flowchart 400 for processes for reducing computing calls for webpage load times and resources to reduce carbon footprints caused by repetitive navigations, according to an embodiment. Note that one or more steps, processes, and methods described herein of flowchart 400 may be omitted, performed in a different sequence, or combined as desired or appropriate.

At step 402 of flowchart 400, a graph algorithm that identifies proportional carbon costs for data loading processes is accessed. The graph algorithm may correspond to a mathematical process, such as a graph algorithmic process or operation, of a service provider application and/or platform to determine proportional power usage, carbon or other costs caused by processing and navigational flows, webpage or other data loading events, and/or cycles of revisiting or reloading data in the processing and navigational flows. Thus, the graph algorithm may include computing code and operations for performing the processes discussed in reference to FIGS. 3A-3C.

At step 404, the data loading processes for a server event with a computing device are determined. The data loading processes may correspond to operations by applications, platforms, and the like of a service provider's computing architecture to provide computing services to end users and the like via computing devices, and/or interact with other devices and servers. In this regard, the data loading processes may correspond to navigations to webpages and/or application interfaces that cause processing and loading of data on computing devices that navigate to the webpages and/or interfaces. The data loading processes may therefore correspond to application operations to respond to calls, execute server and/or network calls, and the like to provide data to computing devices.

At step 406, a state diagram for a flow between the data loading events is determined or accessed. The state diagram may correspond to a diagram representing different states (e.g., webpages, interfaces, or other events that load data to a computing device or server), as well as the transitions between the states (e.g., navigations or subsequent data processing and loading). The state diagram may instead be represented by other diagrams or graphs, such as directed graphs and/or DAGs, which show connections between nodes as edges that represent the flow from each data loading event. Thus, the diagram or graph may show how a flow occurs between the webpages, interfaces, or the like.

At step 408, a data loading event meeting or exceeding a threshold carbon or other cost is identified using the graph algorithm and the state diagram. This may be done by scraping, monitoring, and/or determining attributes for each webpage, interface, or other data loading event, such as a number of views or requests, a time for loading, and/or a payload that is loaded. Each attribute may therefore be used to determine a corresponding carbon, network resource, storage or database resource, and/or data processing resource cost consumed by the data loading event, such as by loading data to a computing device. Using these attributes, a cost for each data loading event a cost to combine data loading events in cycles (e.g., where a cycle is defined as loading a particular event and later reloading the event when the event reoccurs in the state diagram) are determined. This allows for problematic and high consumption data loading events to be identified, which may further show a proportional cost and proportional cost savings by combining one or more data loading events. Such processes are discussed in reference to FIGS. 3A-3C.

In various embodiments, a pop-up interface, side or embedded window, and/or middleware page may be presented to a user in order to reduce a carbon footprint, additional computational resource usage, and/or data storage size may be utilized to present data with a webpage or interface that is currently loaded. This may reduce the requirements for further data loading events and/or repeated data loading events and navigations. For example, the data may be loaded within the interface or middleware pages without require a navigation away from a webpage and/or interface, with a repeated navigation back to the same webpage or interface that wastes computational resources and causes additional carbon emissions. In additional embodiments, the data, interface elements, interface fields and/or menus, media content, and/or executable operations may also be presented within the webpage or interface using a banner, embedded section, and the like. For example, a login and/or multi-factor authentication process may be placed into an embedded banner within a webpage or interface to prevent navigation away from that webpage or interface, with a repeated navigation back to that webpage or interface, that otherwise unnecessarily consumes resources.

At step 410, an action that reduces the proportional cost of the data loading event is determined. The action may correspond to combining and/or merging data into a single data loading event so that a computing device does not navigate away from and then cause a repeated loading of the data for the event, thereby loading the data from multiple events in a single event. For example, a single parent webpage may include data from one or more webpages that may be navigated to from the parent webpage. In other embodiments, the action may include generating or creating an interim and/or improvised data loading event, such as a temporary webpage or application interface, that may include data from multiple different webpages and/or interfaces.

At step 412, the action is then executed with the data loading events. When executing the action, data may be merged and/or combined within a single data loading event, such as a single webpage and/or application interface. However, other options to merge may also be used, such as by hiding and then revealing data when webpage or interface fields or elements are selected, including menu options, providing pop-up or additional windows, and/or by loading all or a portion of the data that is relevant within the original page that receives multiple navigations.

Figure 5:
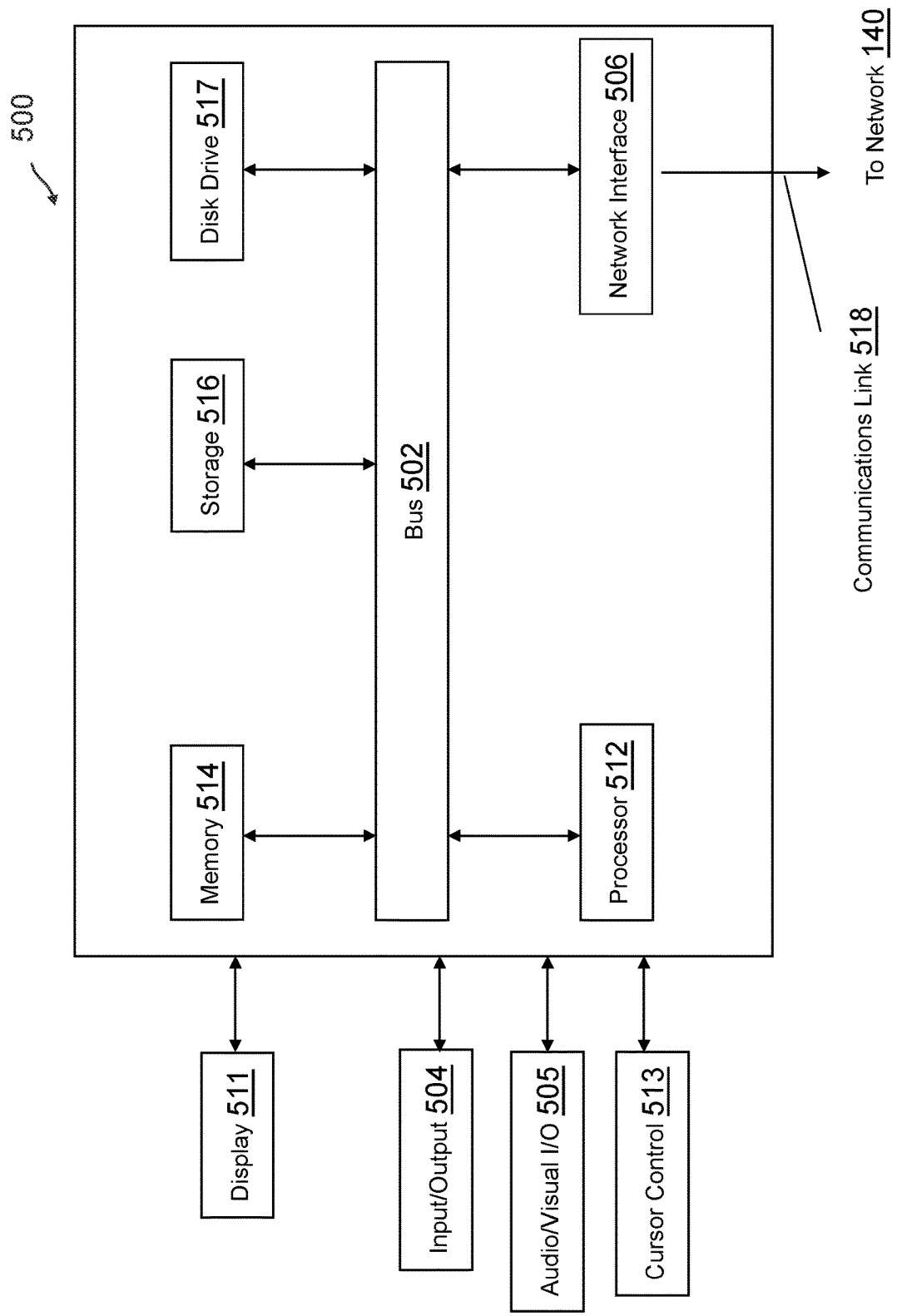
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on gift cards, other types of funding sources that can be used to fund a transaction and provide additional value for their purchase are also within the scope of various embodiments of the invention. Thus, the present disclosure is limited only by the claims.

What is claimed is:
1. A service provider system comprising:
a non-transitory memory; and
one or more hardware processors coupled to the non-transitory memory and configured to read instructions from the non-transitory memory to cause the service provider system to perform operations comprising:

determining a processing flow for navigations between a plurality of webpages for the service provider system;

generating a state diagram for the processing flow based on the navigations between the plurality of webpages;

identifying, based on the state diagram, data loading attributes for the plurality of webpages, and a data loading cost model, a first webpage of the plurality of webpages that causes one or more repetitive navigations that exceed a threshold cost, wherein the data loading cost model comprises a graph algorithm for the state diagram that includes a plurality of variables for the data loading attributes and at least one weighted factor selected to reduce a cost for power usage or carbon emissions based on a corrective action;

determining the corrective action with the first webpage and one or more second webpages of the plurality of webpages that reduces or eliminates the one or more repetitive navigations, wherein the corrective action further reduces the cost below the threshold cost; and executing the corrective action with the plurality of webpages.

2. The service provider system of claim 1, wherein the corrective action comprises combining data for the one or more second webpages with the first webpage.

3. The service provider system of claim 1, wherein the corrective action comprises loading data for the one or more second webpages within an interface of the first webpage using one of an interface menu or a selectable option that presents the data within the first webpage.

4. The service provider system of claim 1, wherein the identifying the first webpage comprises:

obtaining the data loading attributes for the plurality of webpages during the navigations for the processing flow; and processing the data loading attributes and the state diagram using the data loading cost model.

5. The service provider system of claim 4, wherein the data loading attributes comprise at least one of a data payload, a number of visitors to each of the plurality of webpages, or a loading time of each of the plurality of webpages.

6. The service provider system of claim 4, wherein the graph algorithm identifies an amount of the power usage or the carbon emissions caused by revisiting the first webpage from the one or more second webpages during the navigations between the plurality of webpages.

7. The service provider system of claim 1, wherein the corrective action is limited to a number of combinations of the plurality of webpages that prevents merging the plurality of webpages over the number of combinations.

8. The service provider system of claim 1, wherein the generating the state diagram comprises:

scraping webpage data for the plurality of webpages for the navigations; and monitoring activity for the plurality of webpages during the navigations.

9. The service provider system of claim 1, wherein the state diagram comprises a plurality states for the plurality of webpages with a plurality of transitions representing the navigations between the plurality of states.

10. The service provider system of claim 1, wherein the operations further comprise:

determining a problem data loading event for each of the data loading attributes based on carbon emission reduction operation for the data loading attributes, wherein the corrective action is further based on the problem data loading event.

11. A method comprising:

determining server loading processes by a server for data from a database of a service provider associated with the server;

determining a state diagram for the server loading processes when loading the data to a computing device;

identifying, based on the state diagram and a plurality of data loading attributes for the server loading processes, a first server loading process of the server loading processes that is repeated during the server loading processes for the data, wherein the identifying the first server loading process uses a graph algorithm having a plurality of variables for the plurality of data loading attributes, and wherein the graph algorithm identifies a carbon cost for a carbon footprint caused by repeating the first server loading process based on the state diagram;

determining that the first server loading process exceeds a carbon emission threshold for a carbon footprint caused by repeating the one of the server loading processes;

determining a data merging action that prevents repeating the first server loading process based on the state diagram; and performing the data merging action with the server loading processes.

12. The method of claim 11, wherein the server loading processes are associated with loading application data for a plurality of application interfaces for a resident software application on the computing device.

13. The method of claim 11, wherein the server loading processes are associated with loading webpage data for a plurality of webpages hosted by the server and accessible by the computing device.

14. The method of claim 11, wherein the data merging action comprises providing the data that causes repeating of the first server loading process using one of an interface associated with the first server loading process, a menu within the interface, or an additional popup interface with the interface.

15. The method of claim 11, wherein prior to the identifying the first server loading process, the method further comprises:

obtaining a computing architecture for the server of the service provider, wherein the computing architecture comprises computing operations that execute the server loading processes, wherein the first server loading process is further identified based on the computing architecture.

16. The method of claim 15, further comprising:

determining the plurality of data loading attributes for the server loading processes based on the computing architecture.

17. The method of claim 11, wherein the first server loading process is repeated based on a navigation from one or more additional ones of the server loading processes to the first server loading process.

18. A non-transitory machine-readable medium having stored thereon machine-readable instructions executable to cause a machine to perform operations comprising:

determining a processing flow for navigations between a plurality of webpages for a service provider system;

generating a state diagram for the processing flow based on the navigations between the plurality of webpages;

identifying, based on the state diagram, data loading attributes for the plurality of webpages, and a data loading cost model, a first webpage of the plurality of webpages that causes one or more repetitive navigations that exceed a threshold cost, wherein the data loading cost model comprises a graph algorithm for the state diagram that includes a plurality of variables for the data loading attributes and at least one weighted factor selected to reduce a cost for power usage or carbon emissions based on a corrective action;

determining the corrective action with the first webpage and one or more second webpages of the plurality of webpages that reduces or eliminates the one or more repetitive navigations, wherein the corrective action further reduces the cost below the threshold cost; and executing the corrective action with the plurality of webpages.

19. The non-transitory machine-readable medium of claim 18, wherein the corrective action comprises combining data for the one or more second webpages with the first webpage.

20. The non-transitory machine-readable medium of claim 18, wherein the operations further comprise:

determining a problem data loading event for each of the data loading attributes based on carbon emission reduction operation for the data loading attributes, wherein the corrective action is further based on the problem data loading event.

* * * * *